May 8, 1951 H. E. DUNN ET AL 2,551,733
PROCESS OF PRECIPITATING HYDROUS VANADIUM PENTOXIDE
Filed Dec. 23, 1948 3 Sheets-Sheet 1

INVENTORS
Holbert E. Dunn,
Andrew D. Wallace
and Bruno Mayer

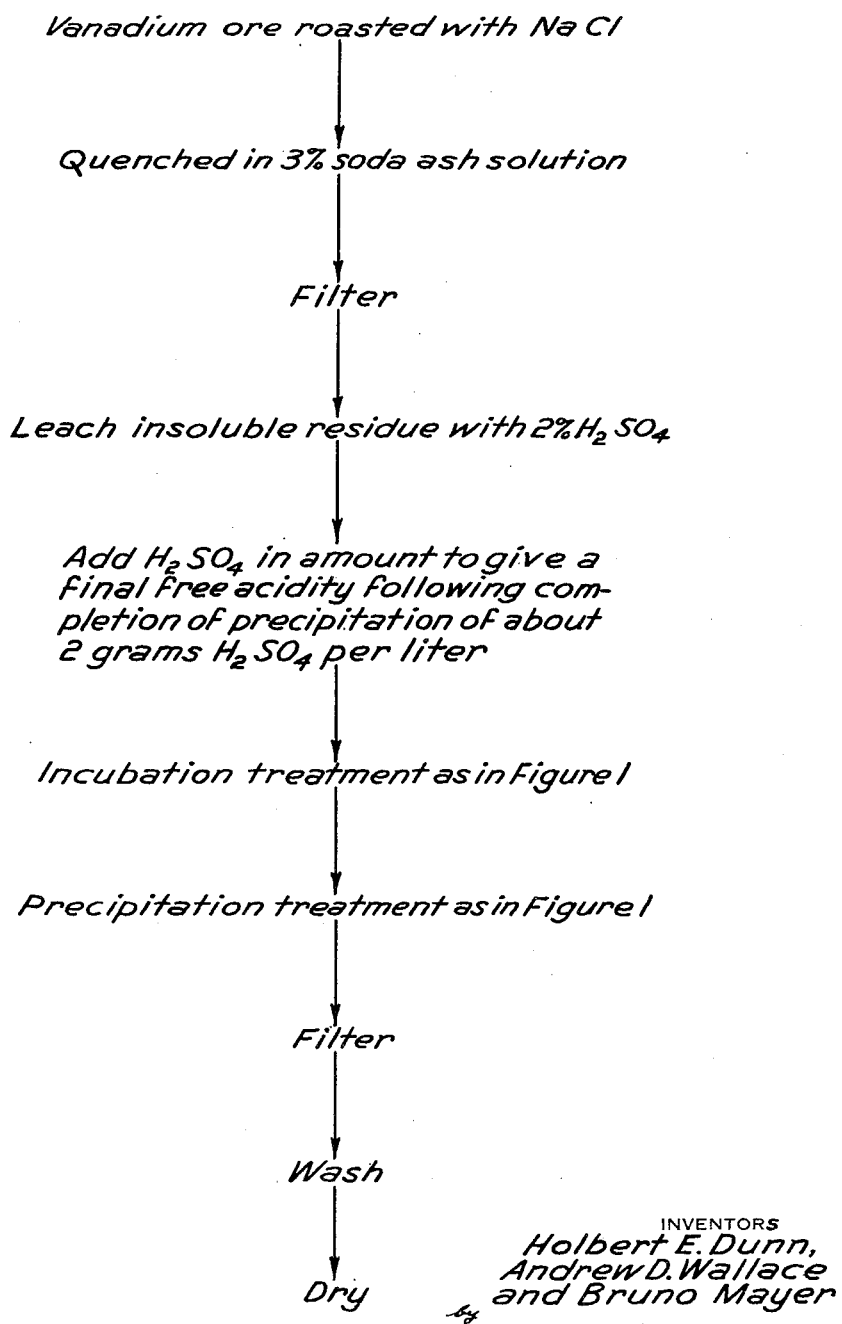

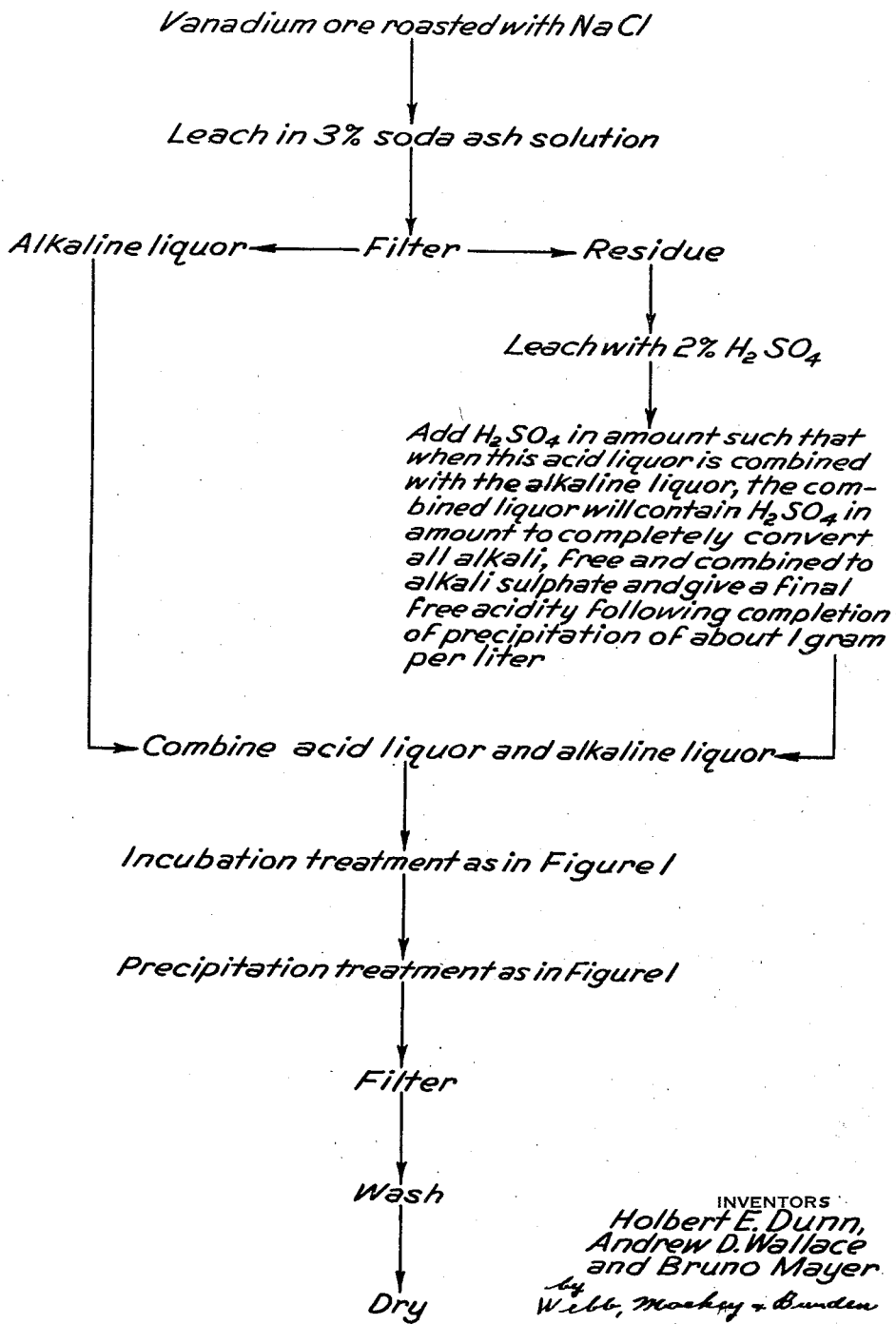

UNITED STATES PATENT OFFICE 2,551,733

PROCESS OF PRECIPITATING HYDROUS VANADIUM PENTOXIDE

Holbert E. Dunn, Crafton, Andrew D. Wallace, Mount Lebanon, and Bruno Mayer, Crafton, Pa., assignors to Vanadium Corporation of America, New York, N. Y., a corporation of Delaware Application December 23, 1948, Serial No. 67,052

10 Claims. (Cl. 23—140)

This invention relates to a process of precipitating hydrous vanadium pentoxide from solutions resulting from roasting and/or leaching vanadiferous ores, slags or other vanadium-bearing materials. It relates more specifically to the hydrolytic precipitation of hydrous vanadium pentoxide from sulphuric acidified vanadium salt solutions. These vanadium salt solutions may be either alkaline, substantially neutral or acidic. The present application is a continuation-in-part of our application Serial No. 623,170, filed October 18, 1945, now abandoned.

In the accompanying drawings which illustrate certain preferred embodiment of our invention:

Figure 2 is a flow sheet illustrating the invention as applied to the treatment of an acid vanadium solution; and Figure 3 is a flow sheet illustrating the invention as applied to the use of alkaline vanadium and acid vanadium solution combined.

Figure 1:
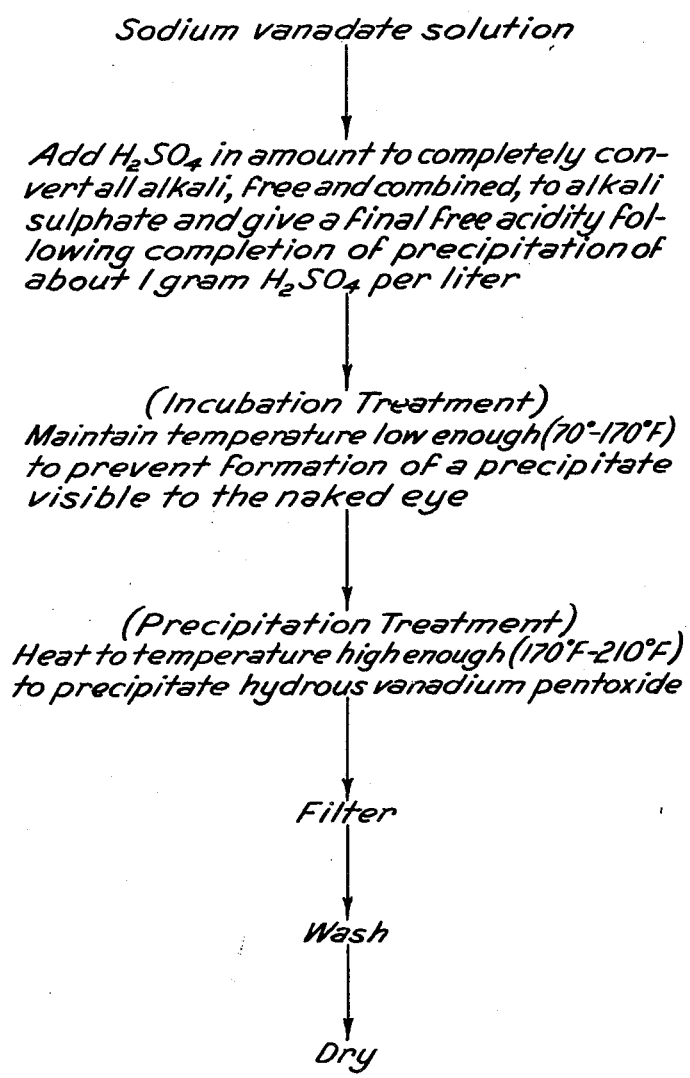
Figure 1 is a flow sheet illustrating the process as applied to the treatment of an alkaline vanadium solution such as a solution of sodium vanadate.

A well known method for recovering vanadium from sodium vanadate solutions is by precipitation with sulphuric acid, the reaction which takes place being:

(1) 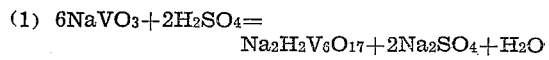
$6NaVO_3 + 2H_2SO_4 = Na_2H_2V_6O_{17} + 2Na_2SO_4 + H_2O$

In carrying out this reaction according to the prior art the practice has been to add sulphuric acid to the sodium vanadate solution prepared for precipitation, the addition being made at some elevated temperature attained (1) by prior heating of the vanadate solution, (2) by heating during the addition of the sulphuric acid, or (3) by the addition of the sulphuric acid itself, or any combination thereof such that precipitation is initiated either during the addition of sulphuric acid or immediately following it.

In carrying out reaction (1), 2 molecules of $H_2SO_4$ are used for 6 atoms of V and when the vanadium is expressed as $V_2O_5$ (which is common practice), it is evident that 2 molecules of $H_2SO_4$ are used for 3 molecules of $V_2O_5$ contained in the sodium vanadate solution. This means that 0.36 pound of $H_2SO_4$ is used per pound of $V_2O_5$ contained in the solution as $NaVO_3$. In actual practice the amount of sulphuric acid used has been sufficient to convert the $NaVO_3$ into disodium hexavanadate $Na_2H_2V_6O_{17}$ and to provide a final free acidity of about 1 gram per liter. Higher proportions of sulphuric acid than this were not used because experience had shown that the vanadium precipitate would partially redissolve. Lower proportions were not used because the precipitation would have been incomplete. This prior art practice produces a precipitate, commonly called "red cake," which is rich in impurities, especially soda, consisting largely of a complex sodium hexavanadate which appears to be the dihydrodeuterohexavanadate $Na_2H_2V_6O_{17}$. Wherever in this specification the terms "complex sodium hexavanadate" or "complex sodium vanadate" are used, this impure complex salt is being referred to. When separated from its mother liquor, as by filtration, the freshly precipitated "red cake" ranges in particle size from sandy, 20-mesh aggregates to fine, silty 200-mesh and finer particles, and carries approximately 50 to 85 per cent moisture. Micro-examination of many types of such precipitates discloses no evidence of crystallinity; they appear rather to be coagulated colloidal gels, at least some types of which can hardly be washed free of mother liquor without incurring some peptization and consequent loss of values.

If, for example, the "red cake" is precipitated according to reaction (1) from the aqueous or soda solution, leaching liquors of salt roasted carnotite or roscoelite ores as practiced in the Colorado-Utah-Arizona district, by the addition of concentrated sulphuric acid to the agitated solution, heated to temperature sufficient to cause precipitation during this period of acid addition or immediately following the termination thereof, in increments interspersed with "riding" or reactive intervals, and the process is so conducted as to give a final free acidity of about 1 gram per liter, a recovery of 98 per cent or better of the vanadium is obtained in the "red cake" precipitate but the product is a soda-rich vanadate. When washed commercially free of sodium sulphate, i. e., to a sulphur content of 0.20 per cent maximum, and preferably less than 0.10 per cent, and the filter cake is dried to equilibrium moisture at say 2 or 3 per cent, a product is obtained which analyzes approximately:

| | Per cent |
|---|---|
| $V_2O_5$ | 81–88 |
| $Na_2O$ | 13–9 |
| $CaO$ | 4–0.5 |
| $Fe_2O_3$ | 0.5–0.1 |
| $SiO_2$ | 0.5–0.1 |
| $H_2O$ | 3.0–2.0 |
| S | .10–.20 |

This product corresponds approximately to the formula for sodium dihydrodeutero-hexavanadate ($Na_2H_2V_6O_{17}$) and can be melted at 980–1100° F., depending on impurity content, and can be cast into ingots, pigs, sheets or cakes to form the ordinary "black oxide" of commerce. The melted and cast material contains $Na_2O$ and $V_2O_5$ in substantially the same proportions as the dried "red cake."

In leaching a salt roast in plain water and carrying out the vanadium precipitation according to Equation 1, the lower Na₂O content above mentioned (9 per cent) is more typical of the "red cake." Likewise 1 to 4 per cent CaO may carry over to the product, particularly if the so-called "high lime" ores of Western United States or Peru are involved. This high lime impurity can be avoided and there can be recovered a corresponding vanadium content that might otherwise escape with the leached tailings as insoluble calcium orthovanadate, by adding sufficient soda ash to the leaching circuit, preferably at the quenching tank following the roaster, to precipitate the lime. The insoluble calcium carbonate is precipitated and filtered off with the other insoluble residue of the ore. By this procedure the formation of precipitates high in lime may be avoided but simultaneously the Na₂O content of the "red cake" approaches the higher limit (13 per cent) of the above range.

The present invention has for its object the production of a pure "red cake" corresponding essentially to the formula V₂O₅ as contrasted with the complex sodium hexavanadate produced in accordance with Equation 1, which corresponds approximately to the formula $$Na_2H_2V_6O_{17}$$

According to our process, we use substantially more sulphuric acid than would be required according to Equation 1 to convert all of the sodium vanadate to the complex sodium hexavanadate and to provide a final free acidity of about 1 gram per liter. In accordance with our invention, we use sulphuric acid in amount to completely convert all alkali, free and combined, to alkali sulphate and to give a final free acidity following completion of precipitation of about 0.10 to 10 grams sulphuric acid per liter. Instead of converting the sodium vanadate principally to complex sodium hexavanadate $$(Na_2H_2V_6O_{17})$$

according to Equation 1, we convert the sodium vanadate to V₂O₅ in accordance with the following equation:

(2)  $6NaVO_3 + 3H_2SO_4 = 3V_2O_5 + 3Na_2SO_4 + 3H_2O$

We use not only sufficient sulphuric acid to convert all of the sodium vanadate to V₂O₅ but to provide a final free acidity in the range of about 0.10 to 10 grams per liter.

It will be noted that in carrying out Equation 2, 3 molecules of H₂SO₄ react with 6 molecules of NaVO₃. Stated otherwise, 3 molecules of H₂SO₄ are used for 6 atoms of V, and when the vanadium is expressed as V₂O₅ (which is common practice) it is evident that 3 molecules of H₂SO₄ are used for 3 molecules of V₂O₅ contained in the sodium vanadate solution. This means that 0.54 pound of H₂SO₄ is used per pound of V₂O₅ contained in the solution as NaVO₃.

It should be explained that while neutral or alkaline solutions of sodium vanadate resulting from the leaching and/or quenching of soda and/or salt roasted vanadium-bearing raw materials are commonly considered as containing the bulk of the vanadium in solution as sodium metavanadate (NaVO₃), in actual practice such liquors are usually found to be a mixture of meta- and orthovanadates, depending on temperature conditions and nature of the sodium salt used in the roasting and/or leaching operations. The reaction between sodium orthovanadate (Na₃VO₄) and sulphuric acid for converting all of the sodium to sodium sulphate and the production of V₂O₅ instead of a complex sodium vanadate is represented by Equation 3:

(3)  $2Na_3VO_4 + 3H_2SO_4 = 3Na_2SO_4 + V_2O_5 + 3H_2O$

According to this equation, 1.62 pounds of H₂SO₄ are required per pound of V₂O₅ in solution as sodium orthovanadate (Na₃VO₄).

In accordance with our invention, we use such an amount of sulphuric acid as will completely convert all alkali, free and combined, to alkali sulphate and give a final free acidity following completion of precipitation of about 0.10 to 10 grams sulphuric acid per liter. The combined alkali can be in the form of sodium metavanadate NaVO₃, sodium orthovanadate Na₃VO₄ or in any other form. In practice, usually 0.8 to 1.0 pound of sulphuric acid per pound of V₂O₅ precipitated is sufficient, but as much as 1.2 to 1.5 pounds of sulphuric acid per pound of V₂O₅ precipitated may be required for liquors which are high in free alkali or in sodium orthovanadate content, rather than the metavanadate.

In carrying out our process, during the addition of the sulphuric acid and for a substantial time after its addition, we maintain the temperature of the solution below that at which a precipitate visible to the naked eye can form. This can be accomplished by adding the sulphuric acid sufficiently slowly and by agitating the mixture with sufficient intensity to avoid or prevent local overheating. This period is referred to herein as the "incubation period" and usually is between 20 and 100 minutes, although it depends upon the concentration of the solution in vanadium, soda and impurities. During the incubation period, neutralization of the free and combined alkali is completed and the vanadium is hydrolyzed to soluble hexavanadic acid. The reaction occurring during the incubation period may be represented by the following equation:

(4)  $6NaVO_3 + 3H_2SO_4 \rightarrow H_4V_6O_{17} + 3Na_2SO_4 + H_2O$

This reaction causes the solution to change in color from white to red but no precipitate visible to the naked eye occurs, the hexavanadic acid remaining in solution.

After the incubation period has been completed, the solution is heated to some higher temperature to partially dehydrate the hexavanadic acid and cause precipitation of hydrous vanadium pentoxide. The reaction occurring during the precipitation period may be represented by the following equation:

(5)  $H_4V_6O_{17} + 3Na_2SO_4 + H_2O + heat \rightarrow$
$3V_2O_5 + 3Na_2SO_4 + 3H_2O$ The precipitation period varies but usually is from 30 minutes to 2 hours.

In dealing with a solution of sodium vanadate and sulphuric acid, high temperatures accelerate the formation of a precipitate, whereas low temperatures retard such precipitate formation. In our process the low temperatures used during the incubation period retard the formation of a precipitate, afford the sulphuric acid an opportunity to react with the NaVO₃ to form sodium sulphate, and cause hydrolysis of the vanadium to soluble hexavanadic acid in accordance with Equation 4. Because of this increased opportunity to react, we can add sulphuric acid in quantity sufficient to completely convert all alkali, free and combined, to alkali sulphate, and thus produce a substantially pure precipitate of hydrated V₂O₅. If the incubation period were eliminated, that is, if the sulphuric acid were added to a heated sodium vanadate solution, or if the temperature of the solution were allowed to rise shortly after the addition of the sulphuric acid, even if the sulphuric acid was used in a quantity sufficient to completely convert all alkali into alkali sulphates, the high temperature would cause formation of a precipitate of complex sodium hexavanadate instead of vanadium pentoxide and the excess sulphuric acid would dissolve some of the precipitate and the yield of precipitate would be unsatisfactory. It is seen, therefore, that in carrying out our process there must be used an amount of sulphuric acid sufficient to completely convert all alkali, free and combined, to alkali sulphate and there must be an incubation period. The incubation period alone without sufficient acid, or sufficient acid without the incubation period, will not give satisfactory results. Of course, in all cases the incubation period is followed by a precipitation period.

The following procedure illustrates our process using an alkaline vanadium solution (sodium vanadate), the procedure being illustrated in Figure 1 of the drawings.

*Procedure 1*

The sodium vanadate liquor to be precipitated, which may range from 5 to 125 grams per liter $V_2O_5$ content, preferably 15 to 60 grams per liter, is transferred to a suitable precipitating tank, usually of wooden construction fitted with a wooden agitator and lead steam heating coils or direct live steam injectors. After a suitable period of agitation, which may be 5 to 10 minutes, a sample is taken to determine the vanadium content and then sufficient sulphuric acid, usually 66° Baumé, is run in in an amount which has been estimated to completely convert all alkali, free and combined, to alkali sulphate and to give a final free acidity following completion of precipitation of about 1 gram per liter.

The mixture is agitated for a further suitable period, which may be of the order of 20 to 40 minutes duration, and then the free acidity of the solution is determined. If the free acidity so determined is lower than past experience has indicated will result in a final free acidity following completion of precipitation of about 1 gram per liter, a further quantity of acid is added and agitation is continued for another suitable period, for example, 10 minutes. This period or these periods of acid addition and agitation constitute the incubation period and there must be maintained throughout this period a temperature lower than that at which precipitation visible to the naked eye occurs. Precipitation is prevented by adding the acid slowly enough and agitating the mixture rapidly enough so as to prevent the temperature of the solution rising too greatly. Following this incubation period, steam is applied to bring the solution to the precipitating temperature. The interval for heating for this purpose may be of the order of 1 hour. During this heating period the solution is sampled at intervals, for example, 15 minutes, and the vanadium content and free acidity of a sample obtained by filtering off the precipitate and analyzing the solution is determined. If upon reaching that stage of the process when the free acidity has fallen to 1 gram per liter, the $V_2O_5$ content of the solution is above 1 gram per liter, an additional small amount of acid is added and agitation and heating are continued for another period and the free acidity and vanadium content of the solution are again determined. This process is repeated until an analysis of a sample of the solution shows a precipitating efficiency of at least 97%, preferably 99%, and a final free acidity as noted below.

During the incubation period above described the temperature should be maintained between 70° F. and 170° F., preferably not over 120° F. During the precipitation period the temperature should be maintained at a temperature higher than the temperature used during the incubation period and between 170° F. and the boiling point, preferably at a temperature between 180° F. and 210° F.

In this procedure reference has been made to a free acidity of 1 gram per liter. The final free acidity can be between 0.10 and 10 grams per liter, but preferably is between 0.1 and 2.0 grams per liter. However, as the final free acidity is increased above about 2 grams per liter, the precipitating efficiency decreases.

The following procedure illustrates our process using an acid vanadium solution, the process being illustrated in Figure 2 of the drawings.

*Procedure 2*

Acid liquor containing vanadium in solution is produced in the following manner. Vanadium ore is roasted with salt (NaCl). The roasted ore is quenched in a 3% soda ash solution and the tailings or residue are separated from the solution by filtration. The tailings are washed with water and then leached with 2% sulphuric acid solution. The resulting acid liquor contains vanadium equivalent to 9.5 grams $V_2O_5$ per liter.

(1) The acid liquor is transferred into a tank and a representative sample of this liquor is tested for free sulphuric acid and vanadium content.

(2) Enough sulphuric acid is added to produce a final free acidity following completion of precipitation of 2 grams per liter of sulphuric acid.

(3) The batch is then agitated for a suitable period, say, 20 to 40 minutes, while maintaining the temperature low enough to prevent the formation of a precipitate visible to the naked eye. This period of acid addition and agitation constitutes the incubation period. If the liquor has become somewhat reduced, of a greenish or bluish tint indicative of the vanadyl state as by chance contact with metallic iron (a condition which retards the precipitation reaction), sodium chlorate or sodium peroxide should be added as a corrective. Usually 1 to 4 pounds of sodium chlorate or sodium peroxide per 1000 gallons of solution is sufficient.

(4) The batch is then heated to a temperature higher than the temperature employed during the incubation period and sufficiently high to precipitate hydrous vanadium pentoxide, agitating the batch during the precipitation period. The precipitation is continued until a yield of about 92 to 95% of the vanadium has been reached. If during the precipitation period the free acidity drops below 2 grams per liter, additional acid is added and the heating and agitation and precipitation are continued until a yield of about 92 to 95% of the vanadium has been reached.

In this procedure reference has been made to a final free acidity of 2 grams per liter. This final free acidity can be from 0.10 to 10 grams per liter but preferably is between 2 and 10 grams per liter.

In case both acid and neutral or alkaline quench or leach liquors are available, the use of both acid liquor and neutral or alkaline liquor for precipitation has been found preferable to the use of either the acid liquor alone or the neutral liquor alone or the alkaline liquor alone. The combined liquors have a lower content of soda than the alkaline liquors alone and the precipitate from the combined liquors tends to be lower in soda than that obtained from the alkaline liquor alone. The combined liquors have a lower amount of dissolved impurities (lime, silica, alumina) than the acid liquor alone, and the precipitate from the combined liquors accordingly is lower in these impurities.

The preferred procedure in precipitating hydrous vanadium pentoxide from combined vanadium-containing acid liquor and vanadium-containing alkaline liquor is to add acid to the acid liquor and thereafter add the alkaline liquor. By following this procedure the incubation period is shortened as compared either with (a) adding the alkaline vanadium liquor to the acid vanadium liquor and thereafter adding acid, or, (b) adding acid to the alkaline vanadium liquor and then mixing it with the acid vanadium liquor.

If either or both liquors have become somewhat reduced, of a greenish or bluish tint indicative of the vanadyl state as by chance contact with metallic iron (a condition which retards the precipitation reaction), sodium chlorate or sodium peroxide should be added as a corrective, preferably after acidifying the acid vanadium liquor and before adding the alkaline or water quench liquor. Usually from 1 to 4 pounds of either material is sufficient to properly oxidize 1000 gallons of solution.

The following illustrates our process employing both acid vanadium liquor and alkaline vanadium liquor, the procedure being illustrated in Figure 3 of the drawings, it being understood that neutral vanadium liquor could be used in place of the alkaline vanadium liquor by following a similar procedure.

Procedure 3

(1) Transfer the acid liquor into the precipitation tank and either before or after such transfer analyze a sample for free acidity and vanadium content.

(2) Add to the acid liquor enough concentrated sulphuric acid so that after the alkaline liquor is mixed with the acid liquor, the combined liquor will contain sulphuric acid in amount to completely convert all alkali, free and combined, to alkali sulphate and give a final free acidity following completion of precipitation of about 1 gram per liter.

(3) Add the alkaline vanadium liquor to the acidified vanadium acid liquor and agitate while maintaining the mixture at a temperature during this incubation period such that no visible precipitate occurs.

(4) After the incubation period and final testing for free acidity as previously described, raise the temperature to that necessary for precipitation and agitate the slurry continuously and cause precipitation of hydrous vanadium pentoxide until a yield of about 95% or better of the vanadium has been obtained. The precipitate is then filtered, washed and dried.

The precipitate is dark red brown, filters rapidly and gives upon fusion a black oxide of high $V_2O_5$ content, usually 92% or higher. The total time for precipitation, namely, the time from the end of the incubation period to the completion of the precipitation ranges up to 2 hours, usually from 1 to 2 hours, depending upon the ratio in which the two vanadium-containing liquors are used. During the course of the precipitation, if the free acidity should drop below 1 gram per liter, an addition of sulphuric acid may be made in order to speed up completion of the reaction, the addition of sulphuric acid being kept within the range of final free acidity of 0.10–10 grams per liter, preferably 0.5–5 grams per liter.

Normally 4 warm (90° F.) water washes of 55 gallons each, totaling 2 displacements, are sufficient to wash a "red cake" containing 350 pounds of $V_2O_5$ to less than 0.10% sulphur content, when subsequently air dried or fused.

In the illustrative procedures and elsewhere in this specification and claims we have used the terms "free acidity" and "final free acidity." We have found that in order to properly determine the free acidity of vanadium liquors containing iron, aluminum, chromium or silicon in solution, a buffer such as sodium fluoride must be used in titrating with standardized sodium hydrate solution against a phenolphthalein indicator, if misleading results are to be avoided by reason of hydrolysis of dissolved salts. The recommended procedure for testing for free sulphuric acid in vanadium liquors containing iron, aluminum, chromium or silicon in solution is as follows:

(1) Add approximately 5 grams of sodium fluoride to 50 cc. of water.

(2) Pipette a 5 or 10 cc. sample (depending upon acidity expected) into the fluoride solution.

(3) Add 10 drops phenolphthalein indicator solution and titrate with 0.1 normal sodium hydrate to the usual pink end-point:

1 cc. N/10 NaOH = 0.0049 grams $H_2SO_4$

When air-dried to equilibrium moisture content of 2 to 3 per cent, the precipitates obtained according to the illustrative procedures will analyze 89 to 93 per cent $V_2O_5$, about 2 to 3 per cent $H_2O$, about 3 to 5.5 per cent $Na_2O$, and 1 to 3 per cent of impurities in fractional amounts consisting variously of lime, ferric oxide, silica, alumina—and uranium oxide (unless previously separated)—when carnotite or roscoelite ores have been involved.

The $Na_2O$ content of our precipitate can be further reduced by washing the precipitate, subsequent to the usual two displacement washes with hot water for sodium sulphate removal, with two displacement washes of hot 2 per cent ammonium sulphate solution, followed by two displacement washes of plain hot water. Similar results in exchange adsorption washing of vanadium pentoxide type precipitates may be obtained by washing with dilute solutions of ammonium nitrate or chloride, calcium chloride, aluminum sulphate or chloride. The cations of aluminum and calcium, however, are not driven off in the usual subsequent fusing operation as in the case of the ammonium salts, and resides in the "black oxide," where their contents amounting to 1 to 3 per cent may not be objectionable or may be actually beneficial depending on the end use.

Since in our process the precipitate is hydrous vanadium pentoxide instead of complex sodium hexavanadate, what little $Na_2O$ is contained in the precipitate is there as adsorbed $Na_2O$ rather than combined $Na_2O$ and may be removed from the precipitate by a relatively small quantity of ammonium sulphate or other washing salt. Thus our process requires only 30 to 50 per cent of the amount of ammonium sulphate which would be required for washing a precipitate in which the $Na_2O$ is present in the form of complex sodium hexavanadate.

If desired, the ammonia or other compounds used for the purpose of reducing the soda content of the vanadium pentoxide precipitate may be incorporated into the liquor from which precipitation is effected instead of employing such compound in the form of a wash. In this case it has been shown that the removal or reduction of soda content is definite although of somewhat lower magnitude than when the preferred washing procedure is employed. It may, nevertheless, be desired to proceed in this manner in some cases in order to secure the best combination of cost, recovery and composition of product for a particular use. The use of the selected compound for soda content reduction by addition of such compound to the mother liquor does not in any way alter the advantageous practice herein described involving an incubation period and a subsequent precipitation period.

By following the conditions of acidity and temperatures of heat treatment in accordance with our invention, the formation of insoluble complex salts of sodium and vanadium is avoided and a true vanadium pentoxide modification is precipitated instead, which, when dried to equilibrium moisture or fused, is shown by the X-ray diffraction spectra to consist of crypto-crystalline vanadium pentoxide.

Air-dried precipitates produced in accordance with our preferred procedure are soluble to the full extent of their vanadium content in aqueous ammonia solutions or sodium carbonate solutions and can be reprecipitated therefrom by the addition of ammonium chloride as simple crystalline ammonium metavanadate, $NH_4VO_3$, of high purity and without formation of complex double salts of sodium and vanadium.

"Red cake" of the high purity resulting from precipitation by our prescribed procedure is somewhat sensitive to reduction from the pentavalent to the tetravalent state, particularly if the moist filter cake is contacted by ferrous metals in handling and drying operations, likewise by exposure to reducing gases or fumes. Otherwise it requires no material deviation from the standard drying and fusing treatments. As a matter of fact, the hydrous vanadium pentoxide obtained from the present invention, not only requires less processing to attain higher purity than previous processes, but the products are outstanding in their enhanced utility.

While we have described the preferred manner of carrying out the process, some of the steps may be omitted under certain circumstances. Thus the addition of sodium carbonate to the leaching circuit is not necessary provided liquors for precipitation can be maintained below about 1.5 grams of CaO per liter. When the acid liquors are well oxidized (vanadium in the pentavalent state), as indicated by an amber color rather than the blue or greenish color indicative of the tetravalent state, and likewise when the alkaline or neutral liquors are water-white or at most pale yellow the sodium chlorate or sodium peroxide addition should be omitted as a matter of economy. Also, when liquors are not carrying an undue excess of soda salts, such as are sometimes necessary to maintain high extraction from the ore, plain water washing of the "red cake" is sufficient to obtain the customary 89-93 per cent $V_2O_5$ content of the product without recourse to ion-exchange adsorption washing.

While it is preferable in carrying out our process that substantially all of the vanadium in the solution to be precipitated be in the pentavalent state, limited amounts not over about 15 per cent, and preferably not over about 5 per cent of the vanadium content of the solution may be in the tetravalent or lower valence state without unduly adversely affecting the process or product.

The foregoing description has been given for clearness of understanding and no undue limitation should be deduced therefrom. The invention is not limited to the preferred procedures but may be otherwise practiced within the scope of the following claims.

We claim:

1. The process of precipitating hydrous vanadium pentoxide from solutions containing pentavalent vanadium, which comprises mixing said solution with sulphuric acid in amount to completely convert all alkali, free and combined, to alkali sulphate and give a final free acidity following completion of precipitation of about 0.10 to 10 grams sulphuric acid per liter, and carrying out the reaction in two periods, the first period being an incubation period of at least 20 minutes extending from the beginning of addition of sulphuric acid to the formation of a visible precipitate, during which incubation period the neutralization is completed and the vanadium is hydrolyzed to soluble hexavanadic acid, the second period being a precipitation period during which the vanadium is partially dehydrated and is precipitated, agitating the mixture of vanadium solution and sulphuric acid during the incubation period and maintaining it at a temperature low enough to prevent the formation of a visible precipitate and to cause substantially complete neutralization of the free and combined alkali and to hydrolyze the vanadium to soluble hexavanadic acid, and thereafter agitating the mixture and heating it during the precipitation period to a temperature higher than the temperature during the incubation period and sufficiently high to partially dehydrate the hexavanadic acid and to precipitate hydrous vanadium pentoxide.

2. A process according to claim 1 wherein during the incubation period the temperature is maintained between about 70° F. and 170° F. and wherein during the precipitation period the temperature is maintained above about 170° F.

3. A process according to claim 1 wherein during the incubation period the temperature is maintained between about 70° F. and 120° F. and wherein during the precipitation period the temperature is maintained between about 180° F. and 210° F.

4. A process according to claim 1 wherein the solution from which hydrous vanadium pentoxide is to be precipitated contains vanadium equivalent to about 15 to 60 grams per liter of $V_2O_5$.

5. A process according to claim 1 wherein the solution from which hydrous vanadium pentoxide is to be precipitated contains at least about 85% of its vanadium content in the pentavalent state.

6. A process according to claim 1 wherein the hydrous vanadium pentoxide precipitate is washed with water to remove sulphates and is thereafter washed with a solution of salt of the group consisting of ammonium sulphate, ammonium nitrate, ammonium chloride, calcium chloride, aluminum sulphate and aluminum chloride to remove sodium by displacement.

7. The process of precipitating hydrous vanadium pentoxide from solutions containing pentavalent vanadium, which comprises mixing acid liquor containing vanadium and alkaline liquor containing vanadium with sulphuric acid in amount to completely convert all alkali, free and combined, to alkali sulphate and give a final free acidity following completion of precipitation of about 0.10 to 10 grams sulphuric acid per liter, and carrying out the reaction in two periods, the first period being an incubation period of at least 20 minutes extending from the beginning of addition of sulphuric acid to the formation of a visible precipitate, during which incubation period the neutralization is completed and the vanadium is hydrolyzed to soluble hexavanadic acid, the second period being a precipitation period during which the vanadium is partially dehydrated and is precipitated, agitating the mixture of vanadium solution and sulphuric acid during the incubation period and maintaining it at a temperature low enough to prevent the formation of a visible precipitate and to cause substantially complete neutralization of the free and combined alkali and to hydrolyze the vanadium to soluble hexavanadic acid, and thereafter agitating the mixture and heating it during the precipitation period to a temperature higher than the temperature during the incubation period and sufficiently high to partially dehydrate the hexavanadic acid and to precipitate hydrous vanadium pentoxide.

8. The process of precipitating hydrous vanadium pentoxide from a mixture of acid and alkaline vanadium-containing liquors, which comprises adding sulfuric acid to the acid liquor in amount such that after the acid vanadium-containing liquor and alkaline vanadium-containing liquor are combined the combined liquor will contain sulphuric acid in amount to completely convert all alkali, free and combined, to alkali sulphate and give a final free acidity following completion of precipitation of about 0.10 to 10 grams sulphuric acid per liter, and carrying out the reaction in two periods, the first period being an incubation period of at least 20 minutes extending from the beginning of addition of sulphuric acid to the formation of a visibile precipitate, during which incubation period the neutralization is completed and the vanadium is hydrolyzed to soluble hexavanadic acid, the second period being a precipitation period during which the vanadium is partially dehydrated and is precipitated, agitating the mixture of vanadium solution and sulphuric acid during the incubation period and maintaining it at a temperature low enough to prevent the formation of a visible precipitate and to cause substantially complete neutralization of the free and combined alkali and to hydrolyze the vanadium to soluble hexavanadic acid, and thereafter agitating the mixture and heating it during the precipitation period to a temperature higher than the temperature during the incubation period and sufficiently high to partially dehydrate the hexavanadic acid and to precipitate hydrous vanadium pentoxide.

9. The process of precipitating hydrous vanadium pentoxide from sodium vanadate solutions, which comprises mixing said solution with sulphuric acid in amount to completely convert all alkali, free and combined, to alkali sulphate and give a final free acidity following completion of precipitation of about 0.10 to 10 grams sulphuric acid per liter, and carrying out the reaction in two periods, the first period being an incubation period of at least 20 minutes extending from the beginning of addition of sulphuric acid to the formation of a visible precipitate, during which incubation period the neutralization is completed and the vanadium is hydrolyzed to soluble hexavanadic acid, the second period being a precipitation period during which the vanadium is partially dehydrated and is precipitated, agitating the mixture of vanadium solution and sulphuric acid during the incubation period and maintaining it at a temperature low enough to prevent the formation of a visible precipitate and to cause substantially complete neutralization of the free and combined alkali and to hydrolyze the vanadium to soluble hexavanadic acid, and thereafter agitating the mixture and heating it during the precipitation period to a temperature higher than the temperature during the incubation period and sufficiently high to partially dehydrate the hexavanadic acid and to precipitate hydrous vanadium pentoxide.

10. The process of precipitating hydrous vanadium pentoxide from solutions containing sodium vanadate, which comprises mixing said solution with sulphuric acid in amount to completely convert all alkali, free and combined, to alkali sulphate and give a final free acidity following completion of precipitation of about 0.10 to 10 grams sulphuric acid per liter, and with at least one salt of the group consisting of ammonium sulphate, ammonium nitrate, ammonium chloride, calcium chloride, aluminum sulphate and aluminum chloride, thereafter carrying out the reaction in two periods, the first period being an incubation period of at least 20 minutes extending from the beginning of addition of sulphuric acid to the formation of a visible precipitate, during which incubation period the neutralization is completed and the vanadium is hydrolyzed to soluble hexavanadic acid, the second period being a precipitation period during which the vanadium is partially dehydrated and is precipitated, agitating the mixture of vanadium solution and sulphuric acid during the incubation period and maintaining it at a temperture low enough to prevent the formation of a visible precipitate and to cause substantially complete neutralization of the free and combined alkali and to hydrolyze the vanadium to soluble hexavanadic acid, and thereafter agitating the mixture and heating it during the precipitation period to a temperature higher than the temperature during the incubation period and sufficiently high to partially dehydrate the hexavanadic acid and to precipiate hydrous vanadium pentoxide.

HOLBERT E. DUNN.
ANDREW D. WALLACE.
BRUNO MAYER.

REFERENCES CITED

The following references are of record in the file of this patent:

UNITED STATES PATENTS

| Number | Name | Date |
|---|---|---|
| 1,596,483 | Frick | Aug. 17, 1926 |
| 1,597,216 | Stokes | Aug. 24, 1926 |
| 1,945,611 | Knight et al. | Feb. 6, 1934 |
| 2,211,119 | Hixson | Aug. 13, 1940 |
| 2,257,978 | Robertson et al. | Oct. 7, 1941 |
| 2,357,988 | Van Wirt et al. | Sept. 12, 1944 |
| 2,442,610 | Meister | June 1, 1948 |